UNITED STATES PATENT OFFICE.

LOUIS PAUL ANGENARD, OF NEW YORK, N. Y.

IMPROVED PROCESS FOR MAKING LOOKING-GLASS.

Specification forming part of Letters Patent No. 46,062, dated January 31, 1865.

*To all whom it may concern:*

Be it known that I, LOUIS PAUL ANGENARD, of the city of New York, and in the county and State of New York, have invented a new and Improved Mode of Making Looking-Glass without Quicksilver; and I do hereby declare that the following is a full and exact description thereof.

The nature of my invention consists in the mode of preparing a chemical solution and its application to glass, thereby producing the same effect as an application of quicksilver, but without its injurious effects to the health, and at a less cost, and more durable.

To enable others skilled in the art to make and use my invention, I will proceed to describe my process to make solution and its application.

Solution: pure platina, two-thirds of an ounce; muriatic acid, two and one-half ounces; nitric acid, one and one-sixth ounce. Use the two acids for the purpose of dissolving the platina, which is done in the usual manner on a sand bath, after which let the mixture rest until the acids have entirely evaporated. After the evaporation of the acids it then becomes necessary to pulverize the mass on a palette of unpolished glass, using alcohol to reduce to a liquid. The preparation is now ready for application, which is done with a brush. As soon as the above preparation is applied put the glass in a muffle or oven and bake until it becomes cherry color. Then allow the glass to cool off before coming in contact with the atmosphere.

What I claim as my invention, and desire to secure by Letters Patent, is—

The chemical proportions and preparation of the solution and its application to plate-glass and all other kinds of glass.

Dated New York, December 20, 1864.

LOUIS PAUL ANGENARD.

Witnesses:
WM. H. MEEKS,
TIMOTHY BALDWIN, Jr.